United States Patent [19]

Adams

[11] Patent Number: 4,968,066
[45] Date of Patent: Nov. 6, 1990

[54] BOLT-ON FLANGE

[75] Inventor: Charles L. Adams, Euless, Tex.

[73] Assignee: PVI Industries Inc., Fort Worth, Tex.

[21] Appl. No.: 386,455

[22] Filed: Jul. 27, 1989

[51] Int. Cl.$^5$ ............................................. F16L 3/04
[52] U.S. Cl. ................................... 285/158; 285/197
[58] Field of Search .............. 285/189, 197, 198, 199, 285/158, 205; 220/85 R, 85 F

[56] References Cited

U.S. PATENT DOCUMENTS

| | | | |
|---|---|---|---|
| 1,048,364 | 12/1912 | Smith | 285/199 |
| 2,473,669 | 6/1949 | White | |
| 2,694,583 | 11/1954 | Zitza et al. | 285/189 X |
| 3,005,968 | 10/1961 | Jones et al. | 285/189 X |
| 3,404,903 | 10/1968 | Frantz | 285/189 X |
| 3,516,692 | 6/1970 | Albrecht | 285/158 X |
| 4,108,476 | 8/1978 | Krupp | 285/158 X |
| 4,179,141 | 12/1979 | Newman | 285/189 |
| 4,512,148 | 4/1985 | Jacobson | 285/158 X |
| 4,541,656 | 9/1985 | Lasko | 285/189 X |
| 4,706,889 | 11/1987 | Hofmann | 285/189 X |

FOREIGN PATENT DOCUMENTS 581440 8/1959 Canada .................. 285/199

Primary Examiner—Dave W. Arola
Attorney, Agent, or Firm—Charles D. Gunter, Jr.

[57] ABSTRACT

A bolt-on fitting is shown for coupling a fitting to an object having external sidewalls and a normally closed interior containing a liquid, such as a water heater tank or boiler. The bolt-on fitting has a body with an inner surface and an outer surface. A plurality of bolt openings are spaced about the periphery of the body. An O-ring is located on the inner surface for sealing between the flange and the mating surface on the tank. The inner surface of the flange is concave, being curved about both a horizontal and a vertical axis drawn to bisect the body so that the bolt openings form isolated points of contact with the tank surface when the flange is bolted into position.

6 Claims, 2 Drawing Sheets

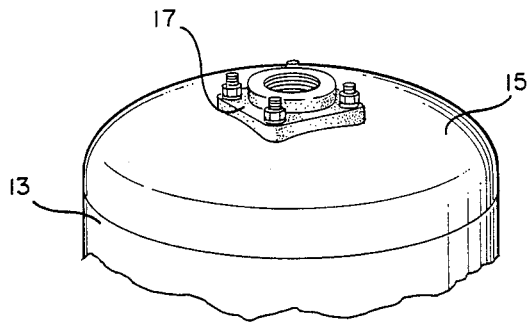
FIG. 4
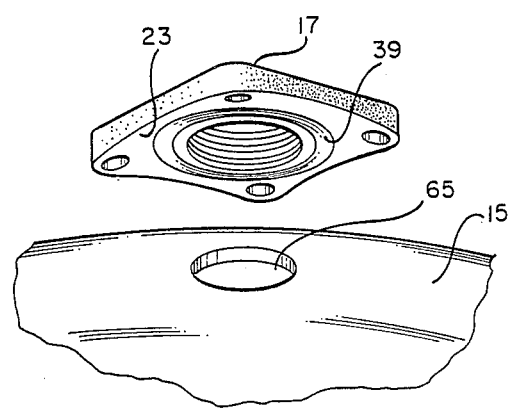
FIG. 5
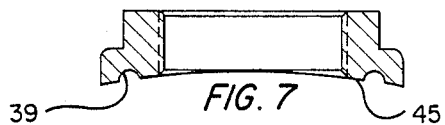
FIG. 7
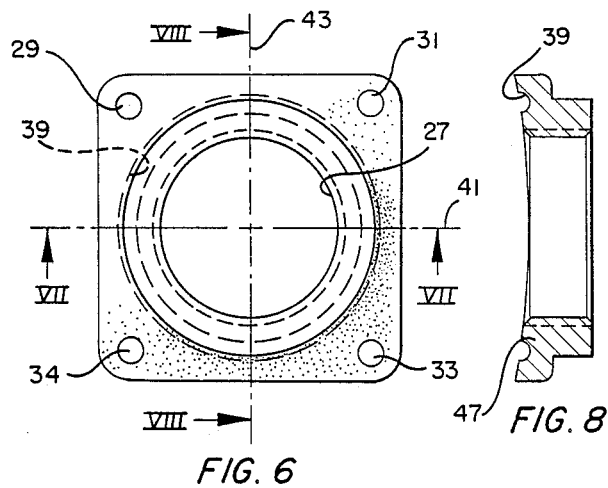
FIG. 6
FIG. 8

BOLT-ON FLANGE

BACKGROUND OF THE INVENTION

1. Field of the Invention

This invention relates generally to an improved flange for coupling various fittings to an object having external sidewalls and a normally closed interior containing a liquid and, specifically, to an improved flange for coupling various fittings to a water heater/boiler tank, piping or related plumbing components.

2. Description of the Prior Art

Water heaters and boilers include a tank which is provided with a plurality of tank openings for attaching pipes, heating elements and similar fittings to the tank. For example, a typical water heater is provided with an inlet valve, a drain valve, and an ASME rated relief valve, among other fittings.

In the past, the tank opening or port typically had a flange welded on for receiving the various tank fittings. The excessive heat used in the welding process often caused the flange to distort, leading to sealing problems and premature failure in use. In addition, the manufacturing steps involved in welding a flange were time consuming and relatively expensive.

The present invention has as its object to provide a bolt-on fitting for a tank opening of a water heater or boiler, or a bolt-on fitting for other related piping or plumbing components, such as a bolt-on fitting for an opening provided in a transfer pipe running to or from a water heater tank.

Another object of the invention is to provide such a flange which is sealed by means of an O-ring seal carried on an inner surface of the flange between the flange and the mating surface of the object to which the flange is attached.

Another object of the invention is to provide a bolt-on flange with a double curved inner surface adapted to mate with either a cylindrical sidewall or a spherical surface.

Additional objects, features and advantages will be apparent in the written description which follows.

SUMMARY OF THE INVENTION

The bolt-on flange of the invention is used for coupling a fitting to an object having external sidewalls and a normally closed interior containing a liquid. For instance, the bolt-on fitting can be used on a water heater tank or boiler of the type having cylindrical external sidewalls. The bolt-on flange includes a body having an inner surface which is adapted to be supported at a selected location on the tank sidewalls and has an outer surface. A plurality of bolt openings are spaced about the periphery of the body and communicate the inner and outer surfaces. An O-ring is located on the inner surface for sealing between the flange and the cylindrical sidewalls when the flange is bolted in place. Retaining means are provided for maintaining the position of the O-ring on the inner surface. The inner surface if preferably concave, being curved about both a horizontal and a vertical axis drawn to bisect the body.

Preferably, the retaining means used to maintain the position of the O-ring is an O-ring groove provided on the inner surface of the flange body. The concave inner surface of the flange body preferably forms a spherical-shaped void on the inner surface, whereby the bolt openings form isolated points of contact with the tank sidewalls when the flange is bolted into position.

BRIEF DESCRIPTION OF THE DRAWINGS

FIG. 4 is an isolated view of the domed top of the tank of FIG. 1 showing a bolt-on flange installed thereon;

FIG. 5 is a schematic view illustrating the double curved inner surface of the flange fitting of the invention;

FIG. 6 is a top view of the bolt-on flange of the invention;

FIG. 7 is a side, cross-sectional view taken along lines VII—VII in FIG. 6; and

FIG. 8 is a cross-sectional view taken along lines VIII—VIII in FIG. 6.

DETAILED DESCRIPTION OF THE INVENTION

Figure 1:
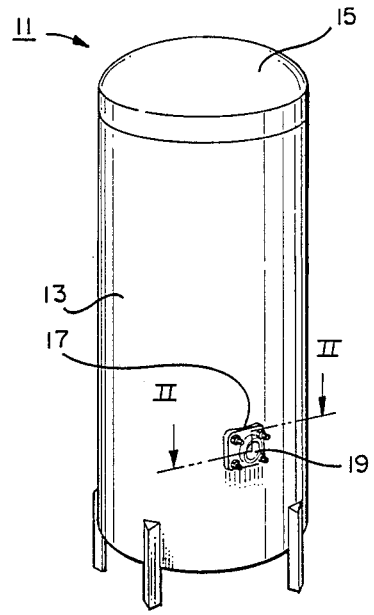
FIG. 1 is a simplified, perspective view of a water heater showing a bolt-on flange of the invention on the tank cylindrical sidewalls.

FIG. 1 shows a water heater tank 11 having cylindrical external sidewalls 13 and a domed top 15. A flange 17 of the invention is shown installed on the tank cylindrical sidewalls 13 about a tank opening 19. The flange 17 could be equipped, for example, with a two inch NPT opening used as a pipe coupling, or could be designed to receive other fittings, such as an electric heating element. Any type fitting can be utilized with the flange of the invention were it is desirable to connect a fitting to an object having external sidewalls and a normally closed interior containing a liquid. For instance, the flange could be used to connect a fitting to an opening provided in a transfer pipe (not shown) running to or from the tank 11.

Figure 2:
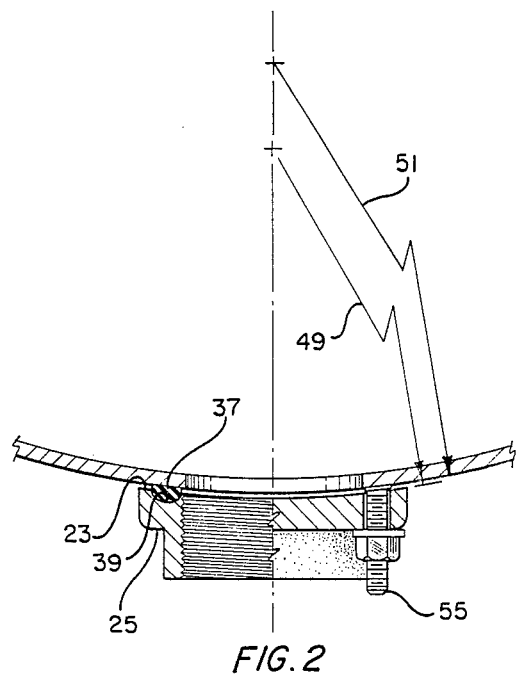
FIG. 2 is a partial, cross-sectional view taken along lines II—II in FIG. 1.
Figure 3:
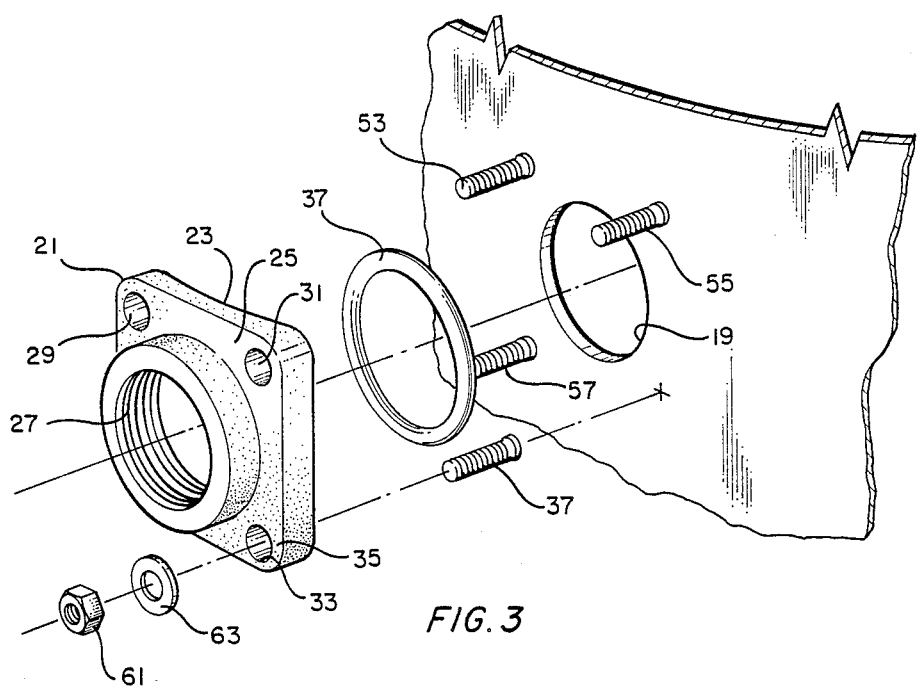
FIG. 3 is an exploded view of the bolt-on flange of FIG. 1 showing the tank opening and a portion of the tank cylindrical sidewalls.

As shown in FIGS. 2 and 3, the flange includes a body 21 having an inner surface 23 adapted to be supported at a selected location on the mating surface of the object to which the flange is attached, in this case the tank exterior surface 25. The flange shown in FIG. 3 has a central opening 27 which, in this case, is a two inch NPT threaded opening for use as a pipe coupling. The body 21 is generally square and includes a plurality of bolt openings (29, 31, 33 shown). The bolt openings are equidistantly spaced about the periphery 35 of the body and communicate the inner and outer surfaces 23, 25.

Sealing means, such as an O-ring 37 is located on the inner surface 23 for sealing between the flange 17 and the tank sidewalls when the flange is bolted in place. Retaining means are provided for maintaining the position of the O-ring on the inner surface 23 to prevent the O-ring from being squeezed out beneath the peripheral edges of the flange. Preferably, the retaining means is an O-ring groove 39 which is located between the bolt openings 29, 31, 33 and the central opening 27.

As shown in FIGS. 2 and 5-8, the inner surface 23 of the body 21 is concave, being curved about both a horizontal and a vertical axis 41, 43 (FIG. 6), respectively, drawn to bisect the body 21. In this way, the inner surface 23 forms a spherical-shaped void (see FIG. 5) with the bolt openings 29, 31, 33, 34 forming isolated points of contact with the tank exterior when the flange is bolted into position. The doubly curved inner surfaces are illustrated as 45, 47 in FIGS. 7 and 8. The radius of curvature employed for each curved inner surface (49 in FIG. 2) is not critical as long as the radius is the same as or smaller than that of the mating surface to which the flange is being attached, in this case, tank exterior 51. The radius of curvature for the doubly curved surfaces 45, 47 (FIGS. 7 and 8) can be identical. As long as the radius of curvature of the inner surface 23 is smaller than the radius of the tank external surface which is to be fit, the flange will rest on 4 points adjacent the bolt openings 29, 31, 33, 34. In this way, when the nuts are tightened onto the bolts during the flange installation, the flange will not be bent or stressed.

A variety of commercially available O-rings can be utilized in the practice of the invention. The O-ring 37 must be of a cross-sectional diameter that will have at least a minimum compression when the four corners of the flange touch the tank exterior in order to maintain the seal. Otherwise, the O-ring dimensions or type of materials are not critical.

In the method of installing a flange of the invention, a plurality of outwardly extending bolts 53, 55, 57, 59 are first installed on the tank exterior about the periphery of the tank opening 19, as by welding. Preferably, the bolts are stud welded by known resistance welding techniques so that the studs fuse and penetrate into the steel of the tank sidewall.

The flange 17 is then located on the tank exterior by passing the outwardly extending bolts 53, 55, 57, 59 through the bolt openings 29, 31, 33, 34 provided in the flange body. The O-ring 37 is retained within the O-ring groove 39 located on the inner surface 23 of the flange body 21 during the assembly. A nut 61 and associated washer 63 are then placed on each bolt and threaded into position to securely seat the flange on the tank exterior and complete the assembly.

As shown in FIG. 4, the doubly curved inner surface 23 allows an identical fitting to be secured to the tank opening 65 provided in the domed top 15.

An invention has been provided with several advantages. Because the flange of the invention can be bolted-on, the flange is not distorted by heat associated with prior art welding techniques. The positioning bolts can be stud welded in a matter of seconds to the tank exterior and the flange can thereafter be bolted-on much more quickly than the welding steps involved in welding the prior art flange to the tank exterior. Because of the curvature of the inner surfaces of the flange body, the flange sits on its four peripheral corners forming a compression seal between the internal O-ring and the tank exterior. There is no tendency to bend or flatten the flange as would happen if the inner surface were flat. The flange fitting can be economically produced from a variety of materials and by a variety of techniques. For instance, the flange can be stamped or cast from steel, bronze, cast iron, and the like.

While the invention has been shown in only one of its forms, it is not thus limited but is susceptible to various changes and modification without departing from the spirit thereof.

I claim:

1. A bolt-on flange for a water heater tank or boiler of the type having cylindrical external sidewalls provided with a plurality of outwardly extending threaded bolts, and a nut for each bolt the flange comprising:
    a body having an inner surface adapted to be supported at a selected location on the tank sidewalls and an outer surface;
    a plurality of bolt openings spaced about the periphery of said body and communicating said inner and outer surfaces, the spacing of said bolt openings being selected to mate with the outwardly extending bolts on said tank sidewalls;
    an O-ring located on said inner surface for sealing between said flange and said cylindrical sidewalls when said flange is bolted in place;
    retaining means for maintaining the position of said O-ring on said inner surface; and
    wherein said inner surface is concave, being curved about both a horizontal and a vertical axis drawn to bisect the body, thereby forming a spherical-shaped void on said inner surface, said bolt openings forming isolated points of contact with said tank sidewalls when said flange is bolts into position by tightening said nuts on said threaded bolts.

2. The bolt-on flange of claim 1, wherein said retaining means is an O-ring groove located on said inner surface of said body.

3. The bolt-on flange of claim 2, wherein said body has a central opening for receiving an associated fitting, said central opening being located within the periphery of said bolt-receiving openings.

4. The bolt-on fitting of claim 3, wherein said O-ring groove and O-ring are located on said inner surface between said central opening and said bolt-receiving openings.

5. A method of installing a flange onto the external sidewalls of a water heater tank or boiler provided with a tank opening on the exterior thereof, the method comprising the steps of:
    welding a plurality of outwardly extending threaded bolts onto the tank exterior about the periphery of the tank opening;
    providing a bolt-on flange with a body having an inner surface and an outer surface, the inner surface being provided with a plurality of bolt openings spaced about the periphery of said body and communicating said inner and outer surfaces, the inner surface of the flange body being formed doubly concave, being curved about both a horizontal and a vertical axis drawn to bisect said body, thereby forming a spherical-shaped void on said inner surface, said bolt openings forming isolated points of contact with said tank sidewalls when said flange is bolted into position;
    locating the flange on the tank exterior by passing the outwardly extending bolts through the bolt openings provided in the flange body;
    sealing the flange to the tank exterior by means of an O-ring located on said inner surface;
    bolting the flange onto the tank by attaching nuts to the threaded bolts and tightening said nuts against said flange to force said flange against said tank.

6. The method of claim 5, wherein said tank has a domed top provided with a top opening and outwardly extending bolts, and wherein a flange is bolted onto the top opening in the same manner as the flange was bolted to the tank sidewalls.

* * * * *